(12) United States Patent
Gerede et al.

(10) Patent No.: US 11,477,498 B2
(45) Date of Patent: *Oct. 18, 2022

(54) METHODS, SYSTEMS, AND MEDIA FOR PRESENTING MEDIA CONTENT ITEMS BELONGING TO A MEDIA CONTENT GROUP

(71) Applicant: Google LLC, Mountain View, CA (US)

(72) Inventors: Cagdas Evren Gerede, San Francisco, CA (US); Vlad Berindei, Bucharest (RO)

(73) Assignee: Google LLC, Mountain View, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/858,944

(22) Filed: Apr. 27, 2020

(65) Prior Publication Data

US 2020/0260128 A1 Aug. 13, 2020

Related U.S. Application Data

(63) Continuation of application No. 16/004,875, filed on Jun. 11, 2018, now Pat. No. 10,638,170, which is a
(Continued)

(51) Int. Cl.
*H04N 21/235* (2011.01)
*H04N 21/262* (2011.01)
(Continued)

(52) U.S. Cl.
CPC ....... *H04N 21/2353* (2013.01); *G06F 16/735* (2019.01); *G06F 16/738* (2019.01);
(Continued)

(58) Field of Classification Search
CPC ............... H04N 21/2353; H04N 21/23; H04N 21/23109; H04N 21/235; H04N 21/2393;
(Continued)

(56) References Cited

U.S. PATENT DOCUMENTS 8,205,227 B1 6/2012 Del Sesto et al.
2006/0004914 A1 1/2006 Kelly et al.
(Continued)

OTHER PUBLICATIONS

Henry, A., "Filebot Gets Your Downloaded Music and Movies in Shape for Your Media Center", last updated Mar. 14, 2013, pp. 1-4, available at: https://lifehacker.com/filebot-gets-your-downloaded-music-and-movies-in-shape-5990500.
(Continued)

*Primary Examiner* — Cynthia M Fogg
(74) *Attorney, Agent, or Firm* — Byrne Poh LLP

(57) ABSTRACT

Methods, systems, and media for presenting media content items belonging to a media content group are provided. In some embodiments, the method comprises: retrieving metadata associated with video content segments, wherein the metadata includes user metadata, description metadata, and time metadata; generating subsets of video content segments from the video content segments based on the user metadata, wherein each of the subsets of video content segments is grouped into media content groups by: normalizing the description metadata; determining a similarity score between the normalized description metadata for a first video content segment and a second video content segment in the subset of video content segments; and determining whether to place the each of the first and second video content segments into a media content group based on the similarity score; arranging the video content segments within each of the media content groups based on time metadata; and causing at least one of the arranged media content groups to be presented in the video window in response to receiving a request for a video content item.

18 Claims, 6 Drawing Sheets

Related U.S. Application Data continuation of application No. 14/811,421, filed on Jul. 28, 2015, now Pat. No. 9,998,772.

(51) Int. Cl.

| | | |
|---|---|---|
| *H04N 21/239* | (2011.01) | |
| *H04N 21/466* | (2011.01) | |
| *H04N 21/431* | (2011.01) | |
| *H04N 21/433* | (2011.01) | |
| *H04N 21/43* | (2011.01) | |
| *H04N 21/23* | (2011.01) | |
| *H04N 21/231* | (2011.01) | |
| *H04N 21/845* | (2011.01) | |
| *G06F 16/735* | (2019.01) | |
| *G06F 16/738* | (2019.01) | |
| *G06F 16/78* | (2019.01) | |

(52) U.S. Cl.
CPC ......... *G06F 16/7867* (2019.01); *H04N 21/23* (2013.01); *H04N 21/235* (2013.01); *H04N 21/2393* (2013.01); *H04N 21/23109* (2013.01); *H04N 21/26258* (2013.01); *H04N 21/43* (2013.01); *H04N 21/431* (2013.01); *H04N 21/4332* (2013.01); *H04N 21/4668* (2013.01); *H04N 21/845* (2013.01)

(58) Field of Classification Search
CPC ............. H04N 21/26258; H04N 21/43; H04N 21/431; H04N 21/4332; H04N 21/4668; H04N 21/845; G06F 16/735; G06F 16/738; G06F 16/7867
USPC .......................................................... 725/34
See application file for complete search history.

(56) References Cited

U.S. PATENT DOCUMENTS

| | | | |
|---|---|---|---|
| 2006/0026524 A1 | 2/2006 | Ma et al. | |
| 2007/0157249 A1* | 7/2007 | Cordray | ................. H04N 5/782 348/E7.071 |
| 2009/0052870 A1 | 2/2009 | Marsh et al. | |
| 2009/0094425 A1 | 4/2009 | Winokur | |
| 2011/0106744 A1* | 5/2011 | Becker | ............. H04N 21/44224 706/46 |
| 2012/0272269 A1* | 10/2012 | Del Sesto | ................ H04N 5/76 725/39 |
| 2012/0278831 A1* | 11/2012 | van Coppenolle | ... H04L 65/612 725/25 |
| 2012/0324466 A1 | 12/2012 | He et al. | |
| 2013/0073574 A1 | 3/2013 | Jin et al. | |
| 2014/0173459 A1 | 6/2014 | Gaiser et al. | |
| 2014/0289818 A1 | 9/2014 | Yahata et al. | |
| 2015/0153910 A1 | 6/2015 | Wheeler et al. | |
| 2015/0356101 A1 | 12/2015 | Cohen et al. | |

OTHER PUBLICATIONS

Notice of Allowance dated Jan. 25, 2018 in U.S. Appl. No. 14/811,421.
Notice of Allowance dated Nov. 14, 2019 in U.S. Appl. No. 16/004,875.
Office Action dated Apr. 20, 2017 in U.S. Appl. No. 14/811,421.
Office Action dated Jul. 25, 2019 in U.S. Appl. No. 16/004,875.
Office Action dated Aug. 29, 2017 in U.S. Appl. No. 14/811,421.
Office Action dated Sep. 29, 2016 in U.S. Appl. No. 14/811,421.

\* cited by examiner

METHODS, SYSTEMS, AND MEDIA FOR PRESENTING MEDIA CONTENT ITEMS BELONGING TO A MEDIA CONTENT GROUP

CROSS-REFERENCE TO RELATED APPLICATIONS

This application is a continuation of U.S. patent application Ser. No. 16/004,875, filed Jun. 11, 2018, which is a continuation of U.S. patent application Ser. No. 14/811,421, filed Jul. 28, 2015, each of which is hereby incorporated by reference herein in its entirety.

TECHNICAL FIELD

The disclosed subject matter relates to presenting media content items belonging to a media content group.

BACKGROUND

Many users interact with video content by accessing the video content from a content hosting service that provides access to many videos. In some cases, a video may be part of a video series and, upon watching a video, the user should watch the next video in the video series (e.g., episode 2 after episode 1). Rather than presenting the user with the next consecutive video in the series, these hosting services typically recommend that the user watch another video based on what videos are currently popular or based on what videos are available from the same source. These recommended videos often fail to include the next consecutive video in the video series. As a result, after watching the video in a video series, the user often conducts a full search for the next video in the video series. Having to perform multiple searches for consecutive videos in a video series can be time consuming and aggravating for the user.

Accordingly, it is desirable to provide new methods, systems, and media for presenting media content items belonging to a media content group.

SUMMARY

In accordance with some embodiments of the disclosed subject matter, methods, systems, and media for presenting media content items belonging to a media content group are provided.

In accordance with some embodiments, a method for recommending video content to users is provided, the method comprising: retrieving metadata associated with a plurality of video content segments, wherein the plurality of video content segments includes video content segments associated with a user account, wherein each of the plurality of video content segments is presentable in a video window, and wherein the metadata includes user metadata, description metadata, and time metadata; generating a plurality of subsets of video content segments from the plurality of video content segments based on the user metadata, wherein each of the plurality of subsets of video content segments is grouped into media content groups by: normalizing the description metadata associated with each video content segment in a subset of video content segments; determining a similarity score between the normalized description metadata for a first video content segment and a second video content segment in the subset of video content segments; and determining whether to place the each of the first and second video content segments into a media content group based on the similarity score; arranging the video content segments within each of the media content groups based on time metadata; and causing at least one of the arranged media content groups to be presented in the video window in response to receiving a request for a video content item.

In some embodiments, the normalizing further comprises removing punctuation marks from the description metadata associated with each of the plurality of video content segments.

In some embodiments, the normalizing further comprises removing consecutive whitespaces from the description metadata associated with each of the plurality of video content segments.

In some embodiments, the normalizing further comprises replacing uppercase characters in the description metadata associated with each of the plurality of video content segments with lowercase characters.

In some embodiments, the normalizing includes replacing characters in the description metadata associated with each of the plurality of video content segments that are deemed to be inconsistent with representative characters.

In some embodiments, the method further comprises using the user metadata to generate the subset of video content segments from the plurality of video content segments by placing video content items associated with the user account into the subset of video content segments.

In some embodiments, the method further comprises removing a video content segment from the plurality of video content segments in response to determining that a length of the description metadata associated with the video content segments is less than a threshold length value.

In some embodiments, the arranging further comprises: determining whether the time metadata associated with the video content segments in the group is within a first threshold time period; and, in response to determining that the time metadata is within the first threshold time period, arranging the video content segments in the group based on title metadata.

In some embodiments, the arranging further comprises, in response to determining that the time metadata is not within the first threshold time period, arranging the video content segments in the group based on time metadata, wherein the time metadata includes the timing information reflecting when the associated video content segment was uploaded to a content server.

In some embodiments, the arranging further comprises, in response to determining that a first portion of the video content segments and a second portion of the video content segments within the group are separated by timing information greater than a second threshold time period, dividing the first portion of the video content segments into a first subgroup and the second portion of the video content segments into a second subgroup.

In some embodiments, causing the sorted group to be presented further comprises, in response to determining that a first video content segment from the group is being presented in the video window, placing a second video content segment in a queue, wherein the first video content segment and the second video content segment are sequentially ordered in the sorted group.

In some embodiments, causing the sorted group to be presented further comprises presenting at least a portion of the sorted group in response to receiving a request for one or more of the video content segments within the group.

In some embodiments, causing the sorted group to be presented further comprises generating a selected list of video content segments that is presented in response to receiving a request for one or more of the video content segments within the group.

In some embodiments, the method further comprises: in response to a video content segment being uploaded in connection with the user account, determining whether the video content segment is to be placed in the one or more groups; and transmitting a notification to the user account that queries whether the video content segment should be placed in the one or more groups.

In some embodiments, title metadata is extracted from the description metadata.

In some embodiments, the method further comprises determining whether to update the one or more groups based on activity associated with the user account and the one or more video content segments; modifying the placement of one or more video content segments from the one or more groups based on the determination.

In accordance with some embodiments, a system for recommending video content to users is provided. The system comprising at least one hardware processor that is programmed to: retrieve metadata associated with a plurality of video content segments, wherein the plurality of video content segments includes video content segments associated with a user account, wherein each of the plurality of video content segments is presentable in a video window, and wherein the metadata includes user metadata, description metadata, and time metadata; generate a plurality of subsets of video content segments from the plurality of video content segments based on the user metadata, wherein each of the plurality of subsets of video content segments is grouped into media content groups by: normalizing the description metadata associated with each video content segment in a subset of video content segments; determining a similarity score between the normalized description metadata for a first video content segment and a second video content segment in the subset of video content segments; and determining whether to place the each of the first and second video content segments into a media content group based on the similarity score; arrange the video content segments within each of the media content groups based on time metadata; and cause at least one of the arranged media content groups to be presented in the video window in response to receiving a request for a video content item.

In accordance with some embodiments, a non-transitory computer-readable medium containing computer executable instructions that, when executed by a processor, cause the processor to perform a method for recommending video content to users is provided. The method comprising: retrieving metadata associated with a plurality of video content segments, wherein the plurality of video content segments includes video content segments associated with a user account, wherein each of the plurality of video content segments is presentable in a video window, and wherein the metadata includes user metadata, description metadata, and time metadata; generating a plurality of subsets of video content segments from the plurality of video content segments based on the user metadata, wherein each of the plurality of subsets of video content segments is grouped into media content groups by: normalizing the description metadata associated with each video content segment in a subset of video content segments; determining a similarity score between the normalized description metadata for a first video content segment and a second video content segment in the subset of video content segments; and determining whether to place the each of the first and second video content segments into a media content group based on the similarity score; arranging the video content segments within each of the media content groups based on time metadata; and causing at least one of the arranged media content groups to be presented in the video window in response to receiving a request for a video content item.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
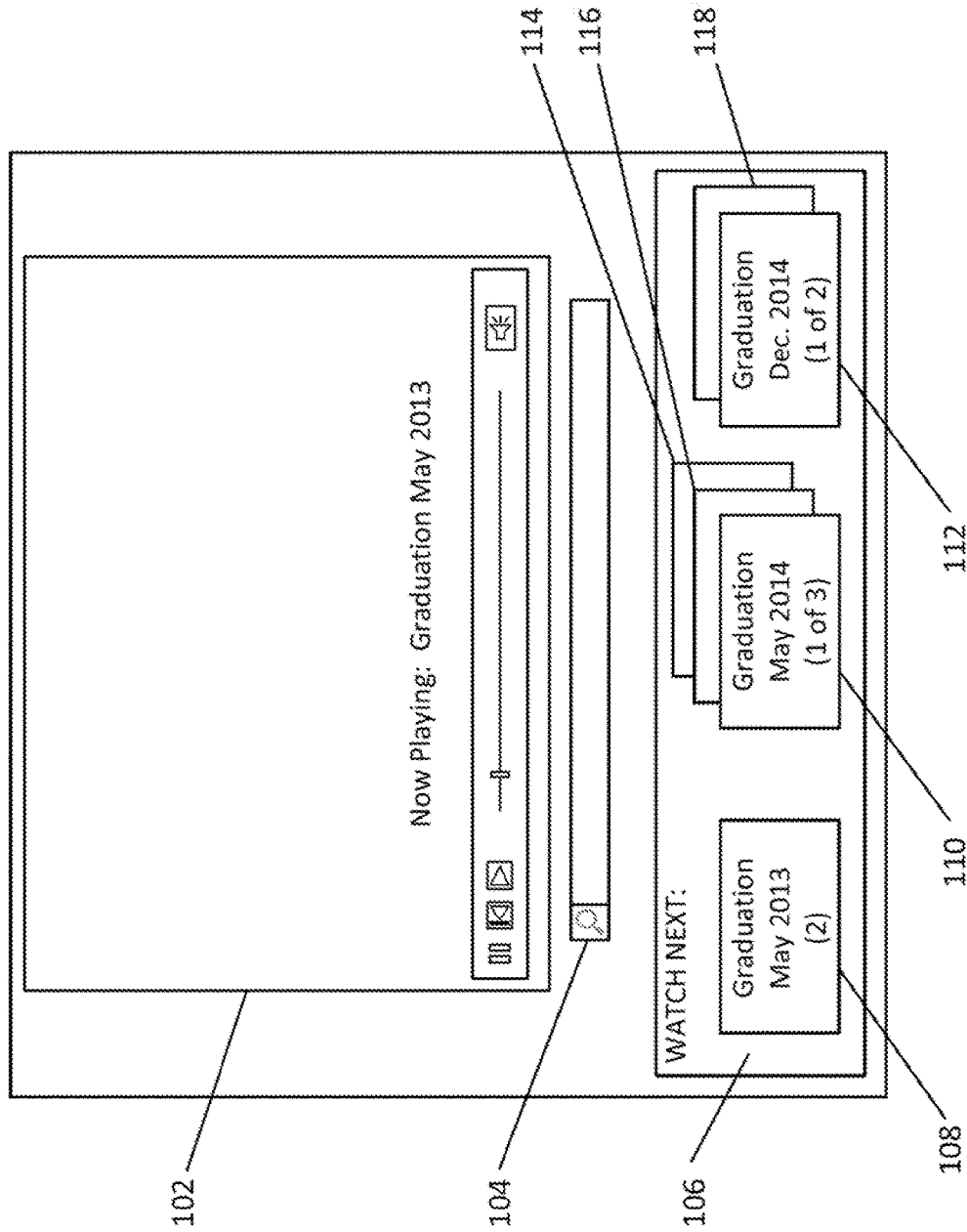
FIG. 1 shows an example of a user interface for presenting media content items belonging to media content groups in accordance with some embodiments of the disclosed subject matter.

In accordance with various embodiments of the disclosed subject matter, mechanisms (which can include methods, systems, and media) for determining and presenting media content items belonging to a media content group are provided.

Generally speaking, the mechanisms described herein can determine whether media content items from a content source, such as a video database, should be placed in a media content group. It should be noted that, based on any suitable metadata associated with each media content item (e.g., user metadata, time metadata, title metadata, etc.), the media content items in a media content group can be ranked accordingly. For example, in response to playing back a media content item, the mechanisms can present a user with other media content items belonging to the media content group associated with the media content item being played back. In another example, in response to searching for media content, the mechanisms can present search results that include multiple media content items belonging to a media content group (e.g., as a playlist of media content items from the media content group). In yet another example, in response to playing back a media content item, the mechanisms can present the user with a recommendation as to the next successive media content item in the media content group that should be played back. In a further example, in response to playing back a media content item to completion, the mechanisms can cause the next successive media content item in the media content group to be automatically played back.

In some embodiments, the mechanisms described herein can access metadata associated with media content items from a content source and compare title metadata of a media content item with the title metadata of other media content items from the content source to determine whether particular media content items should be placed in a media content group. In some embodiments, the mechanisms can normalize the title metadata prior to determining whether particular media content items should be placed in a media content group. For example, the mechanisms can remove punctuation and/or correct spelling errors from particular types of metadata (e.g., title metadata). In another example, the mechanisms can remove consecutive whitespaces from particular types of metadata. In yet another example, the mechanisms can replace uppercase characters within particular types of metadata with lowercase characters. In a further example, the mechanisms can determine whether special characters are used within particular types of metadata and can replace special characters with representative characters (e.g., replace the letter "u" with an umlaut in video titles from a video database with the letter "ü").

In some embodiments, the mechanisms can compare title metadata by calculating a string similarity metric for media content items uploaded by a particular user. The mechanisms can then determine, based on the string similarity metric, whether any of the media content items are part of a media content group. The mechanisms can then, in some embodiments, order or rank the media content items within a media content group in an order suitable for consecutive viewing. For example, the mechanisms can order the media content items in a media content group by title metadata in alphabetical order.

In a more particular example, if a video series included video content having the titles "Graduation 2013 part 2," "Graduation 2013 part 1," and "Graduation 2013 part 3," the mechanisms can order the video content within the media content group such that the video content entitled "Graduation 2013 part 1" would be followed by the video content entitled "Graduation 2013 part 2" and then the video content entitled "Graduation 2013 part 3." The mechanisms can then present the media content group in the determined order. To continue the above-mentioned example, in response to detecting that a user is currently viewing the video content entitled "Graduation 2013 part 1," the mechanisms can present the user with the video content entitled "Graduation 2013 part 2" in any suitable manner such that the user can begin watching "Graduation 2013 part 2" immediately upon playing back "Graduation 2013 part 1" to completion or upon receiving an input to watch the next video. In a more particular example, the mechanisms can present the user with a selectable icon representing the video content entitled "Graduation 2013 part 2" while the user is currently watching the video content entitled "Graduation 2013 part 1."

It should be noted that, although the embodiments described herein generally mention video content and the determination and presentation of video content belonging to a video content group (e.g., a video series), any suitable media content can be placed into a media content group and presented or recommended to a user. For example, the mechanisms can be applied to audio content, image content, etc.

Turning to FIG. 1, an example 100 of a user interface for determining media content in a media content group and presenting such media content is illustrated in accordance with some embodiments of the disclosed subject matter. As shown, in some embodiments, user interface 100 can include a video window 102, a search element 104, and one or more selectable video content segment elements 106.

Video window 102 can be any suitable video window associated with a provider of user interface 100. In some embodiments, video window 102 can include icons, graphics, animations, links, and/or any other suitable content. Note that the position of video window 102 in user interface 100 is merely an example, and video window 102 can be located at any suitable position. In some embodiments, video window 102 can be omitted.

Search element 104 can be any suitable search element for user interface 100. In some embodiments, search element 104 can include any suitable text, images, icons, graphics, animations, links, and/or any other suitable content. Note that the position of search element 104 in user interface 100 is merely an example, and search element 104 can be located at any suitable position. In some embodiments, search element 104 can be omitted.

Selectable video content segment elements 106 can be any selectable elements suitable for representing video content segments in user interface 100. In some embodiments, selectable video content segment elements 106 can be any selectable elements suitable for causing an associated video content segment to be displayed at video window 102. For example, selectable video content segment elements 106 can be hyperlinks, selectable icons, selectable photos or screenshots representative of the video content segment, or any other suitable selectable elements or combination of selectable elements. In some embodiments, selectable video content segment elements 106 can include any suitable number of video content segment elements (e.g., one, two, five, ten, and/or any other suitable number). In some embodiments, selectable video content segment elements 106 can be presented in user interface 100 in any suitable position, combination, pattern, or arrangement. In some embodiments, selectable video content segment elements 106 can be omitted.

In some embodiments, video window 102 can display a video content segment that is part of a group of video content segments and selectable video content segment elements 106 can represent the other video content segment or segments in a group or groups of video content segments, such that the selectable video content segment elements 106 present the user with the option to view the other video content segment or segments in the group by selecting one of the selectable video content segment elements 106. For example, in some embodiments, as displayed in FIG. 1, video window 102 can display a video content segment titled "Graduation May 2013" while selectable video content segment element 108 can present the user with the option to view a video content segment titled "Graduation May 2013 (2)" that has been placed in the associated content group by selecting the selectable video content segment element 108. In yet another example, in response to playing back the video content segment titled "Graduation May 2014 (1 of 3), the next selectable video content segment 114 (e.g., the video content segment titled "Graduation May 2014 (2 of 3)) can be automatically played back in video window 102.

In some embodiments, user interface 100 can present selectable video content segment elements 106 as a group of video content segments. For example, as shown in FIG. 1, selectable video content segment element 110, titled "Graduation May 2014 (1 of 3)" is grouped with selectable video content segment elements 114 and 116 and selectable video content segment element 112, titled "Graduation Dec. 2014 (1 of 2)" is grouped with selectable video content segment element 118.

Additionally or alternatively, user interface 100 can present any suitable representation of a media content group. For example, in response to playing back the video content segment titled "Graduation May 2014 (1 of 3), the next selectable video content segment 114 can be presented. In another example, any suitable number of screenshots from the video content segments in the media content group can be selected and presented as representations of the grouping including selectable video content segment elements 114 and 116.

Figure 2:
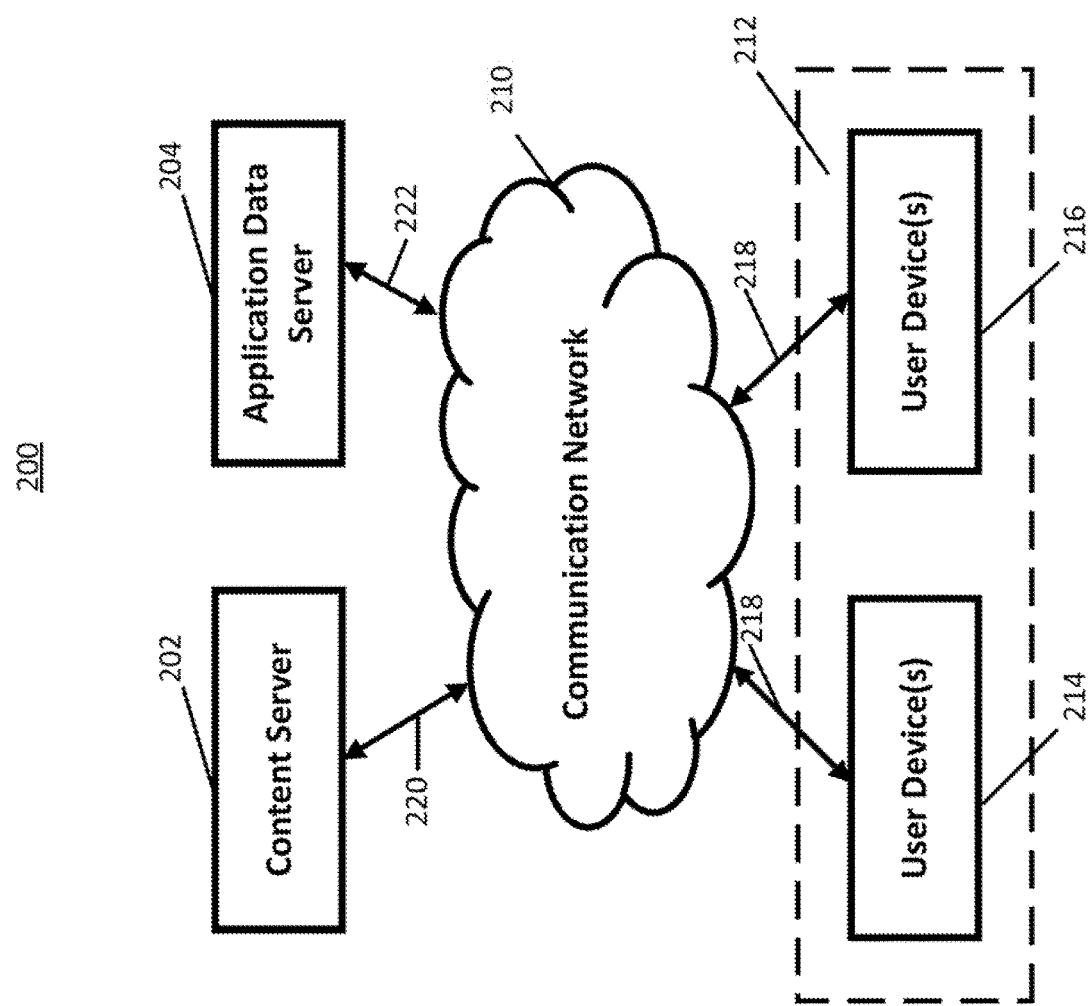
FIG. 2 shows a schematic diagram of an illustrative system suitable for implementation of the mechanisms described herein for determining and presenting media content items belonging to media content groups in accordance with some embodiments of the disclosed subject matter.

Turning to FIG. 2, an example 200 of hardware for presenting media content items belonging to a media content group that can be used in accordance with some embodiments of the disclosed subject matter is shown. As illustrated, hardware 200 can include one or more servers such as a content server 202 and an application data server 204, as well as a communication network 210, and/or one or more user devices 212, such as user devices 214 and 216.

In some embodiments, content server 202 can be any suitable server for storing media content and delivering the content to a user device 212. For example, content server 202 can be a server that streams media content to a user device 212 via communication network 210. Media content provided by content server 202 can be any suitable content, such as video content, audio content, electronic books, documents, images, and/or any other suitable type of media content. As a more particular example, media content can include television programs, movies, cartoons, sound effects, streaming live content (e.g., a streaming radio show, a live concert, and/or any other suitable type of streaming live content), and/or any other suitable type of media content. Media content can be created and uploaded to content server 202 by any suitable entity. In some embodiments, content server 202 can be omitted.

In some embodiments, application data server 204 can be any suitable server for storing and/or transmitting information related to one or more applications. As a more particular example, in some embodiments, application data server 204 can store and/or transmit information related to whether a particular application has been installed on a device associated with a user. As another more particular example, in some embodiments, application data server 204 can store and/or transmit information related to how recently a particular application has been used by an account or device associated with a particular user (e.g., a date the application was last used, a number of days since the application was last used, and/or any other suitable measure). As yet another more particular example, in some embodiments, application data server 204 can store and/or transmit information related to how often a particular application has been used by an account or device associated with a particular user. In some embodiments, application data server 204 can be omitted.

Communication network 210 can be any suitable combination of one or more wired and/or wireless networks in some embodiments. For example, communication network 210 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 212 can be connected by one or more communications links 218 to communication network 210 which can be linked via one or more communications links (e.g., communications links 220 and/or 222) to content server 202, application data server 204, advertisement server 206, and payment server 208. Communications links 218, 220, and/or 222 can be any communications links suitable for communicating data among user devices 212 and servers 202 and/or 204 such as network links, dial-up links, wireless links, hard-wired links, any other suitable communications links, or any suitable combination of such links.

User devices 212 can include any one or more user devices suitable for requesting content, searching for content, viewing content, presenting advertisements, and/or any other suitable functions. For example, in some embodiments, a user device 212 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, a user device 212 can be implemented as a non-mobile device such as a desktop computer, a set-top box, a television, a streaming media player, a game console, and/or any other suitable non-mobile device.

Although content server 202 and application data server 204 are illustrated as separate devices, the functions performed by content server 202 and application data server 204 can be performed using any suitable number of devices in some embodiments. For example, in some embodiments, the functions performed by either content server 202 or application data server 204, can be performed on a single server. As another example, in some embodiments, multiple devices can be used to implement the functions performed by content server 202 and application data server 204.

Although two user devices 214 and 216 are shown in FIG. 2 to avoid over-complicating the figure, any suitable number of user devices, and/or any suitable types of user devices, can be used in some embodiments.

Figure 3:
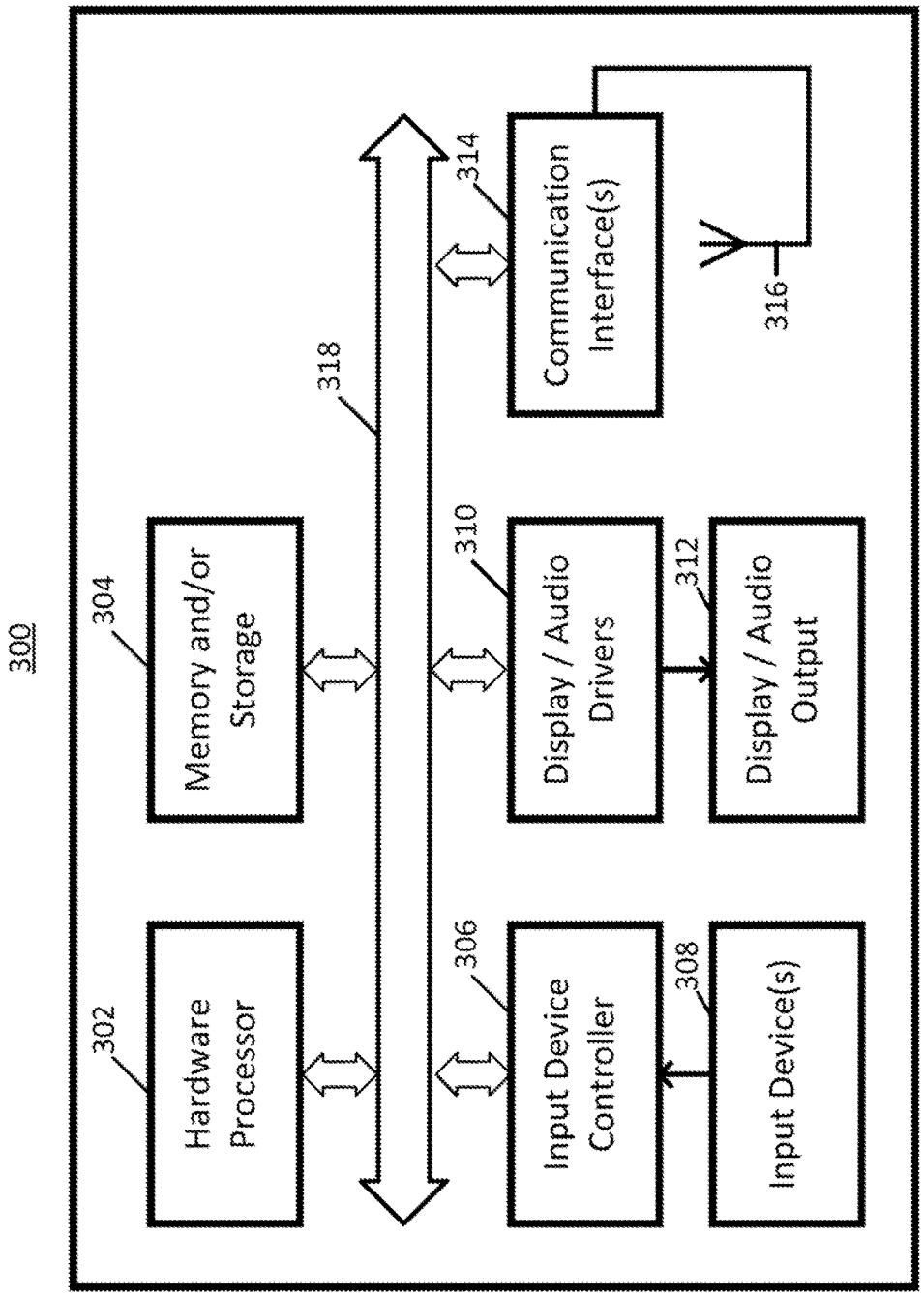
FIG. 3 shows a detailed example of hardware that can be used in a server and/or a user device of FIG. 2 in accordance with some embodiments of the disclosed subject matter.

Content server 202, application data server 204, and user devices 212 can be implemented using any suitable hardware in some embodiments. For example, in some embodiments, devices 202, 204, and 212 can be implemented using any suitable general purpose computer or special purpose computer. For example, a mobile phone may be implemented using a special purpose computer. Any such general purpose computer or special purpose computer can include any suitable hardware. For example, turning to FIG. 3, as illustrated in example hardware 300, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as one of servers 202 or 204). For example, the server program can cause hardware processor 302 to present consecutive videos in a video series, and/or perform any other suitable actions. In some embodiments, hardware processor 302 can be controlled by a computer program stored in memory and/or storage 304 of a user device 212. For example, the computer program can cause hardware processor 302 to request a media content item, present consecutive videos in a video series, and/or perform any other suitable actions.

Memory and/or storage 304 can be any suitable memory and/or storage for storing application information, programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or from any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 210 as shown in FIG. 2. For example, interface(s) 314 can include network interface card circuitry, wireless communication circuitry, and/or any other suitable type of communication network circuitry.

Antenna 316 can be any of one or more suitable antennas for wirelessly communicating with a communication network (e.g., communication network 210) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
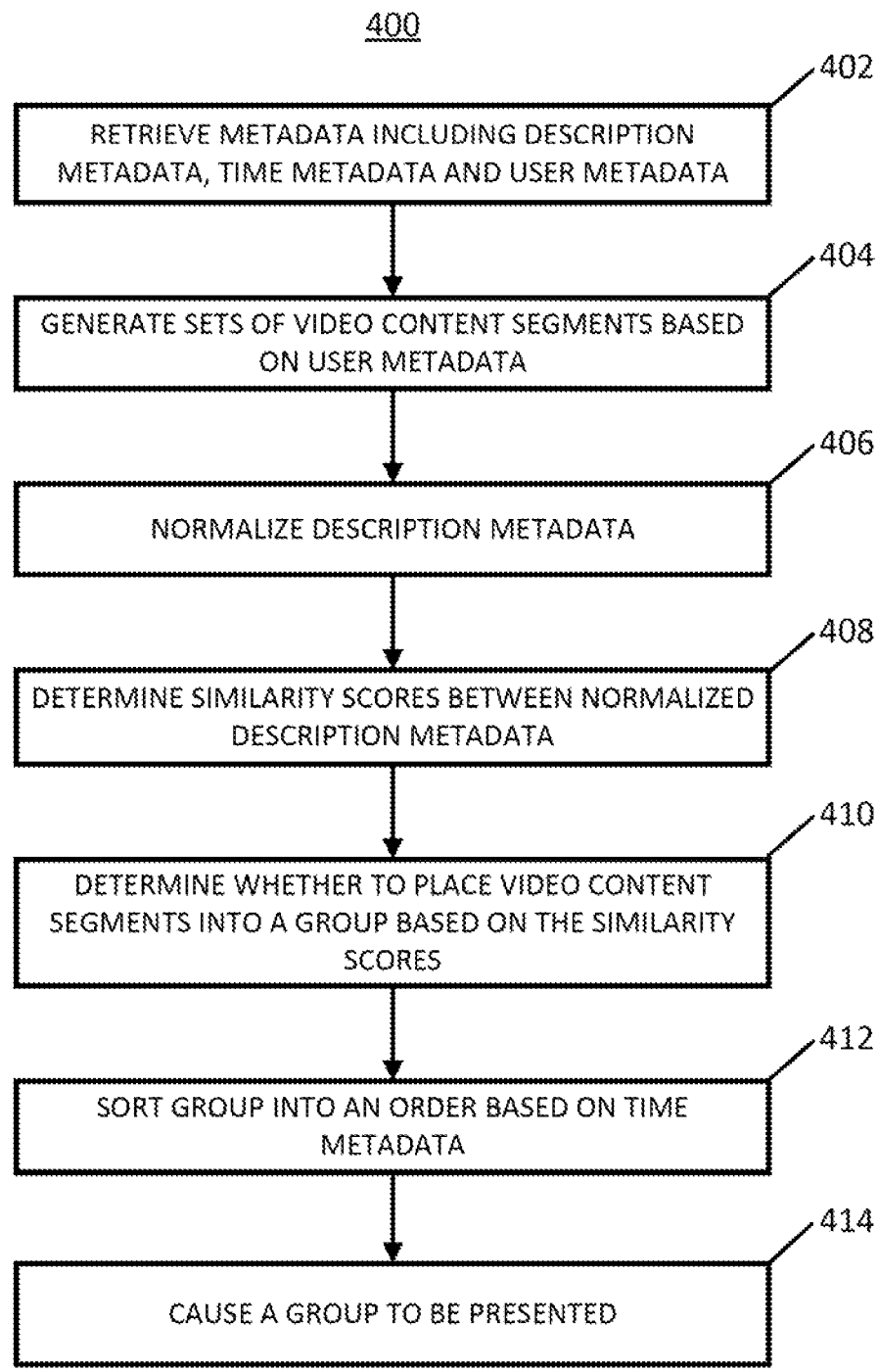
FIG. 4 shows an example of a process for determining and presenting media content items belonging to media content groups from a media source in accordance with some embodiments of the disclosed subject matter.

Turning to FIG. 4, an example 400 of a process for presenting media content items belonging to a media content group is shown in accordance with some embodiments of the disclosed subject matter.

In some embodiments, process 400 can be executed by any device or combination of devices. For example, process 400 can utilize content server 202, application data server 204, one or more user devices 212, and/or any other suitable device.

Process 400 can begin at 402 by retrieving metadata associated with multiple video content segments. The metadata can include, for example, description metadata (e.g., a text string description of a video content segment), user metadata (e.g., a text string of the user that uploaded the video content segment, a text string of the user that created the video content segment, etc.), time metadata (e.g., a timestamp indicating when the video content segment was created, a timestamp indicating when the video content segment was uploaded, etc.), and/or any other suitable type of metadata. In a more particular example, process 400 can access a video database containing multiple pieces of video content and retrieve metadata associated with each piece of video content. In another more particular example, process 400 can transmit a query to a video database containing multiple pieces of video content and request particular types of metadata associated with each piece of video content, such as title metadata, user metadata, and time metadata.

It should be noted that process 400 can retrieve any suitable type of media content metadata, such as a title, a director's name, a description of the media content, and/or any other metadata suitable for describing a media content segment.

In some embodiments, the user metadata can include any suitable information related to a user. For example, in some embodiments, the user metadata can include a user account, an IP address, preferences associated with a user account, information about content that a user has uploaded, information about content that a user has viewed, and/or any other suitable information related to a user. As another example, the user metadata can include information describing the activity of a user or users associated with one or more video content segments. In a more particular example, the user metadata can include information about previous video content segments that a user account has uploaded. In another more particular example, the user metadata can include the times at which a user account has uploaded video content segments. In yet another more particular example, the user metadata can include information about how often the user account previously uploaded video content segments have been watched consecutively.

In some embodiments, the time metadata can include any suitable time metadata associated with a video content segment. For example, in some embodiments, the time metadata can include the time at which the video content segment was uploaded. As another example, in some embodiments, the time metadata can include the time at which the video was recorded.

At 404, process 400 can generate sets of video content segments based on user metadata using any suitable technique or combination of techniques and any suitable information. For example, in some embodiments, process 400 can create sets of video content segments, where each set contains video content segments associated with the same user metadata. As a more particular example, process 400 can generate sets of video content segments, where each set contains video content segments uploaded by the same user account. As another more particular example, process 400 can generate sets of video content segments, where each set contains video content segments uploaded from the same IP address.

It should be noted that, in some embodiments, process 400 can exclude video content segments from the set based on metadata associated with the video content segment. For example, process 400 can exclude a video content segment if the length of its associated description metadata is fewer characters than a threshold length value (e.g., three characters, five characters, etc.).

At 406, process 400 can normalize the text string metadata using any suitable technique or combination of techniques and any suitable information. For example, in some embodiments, turning to FIG. 5, process 500 is an illustrative example of a process for normalizing text string metadata. It should be noted that any suitable metadata or type of metadata can be normalized prior to placing media content segments into media content groups.

Process 500 can begin at 502 by removing some or all punctuation from the description metadata. For example, in some embodiments, if a video is associated with description metadata that includes a title of "World Cup—1 of 2! !", process 404 can remove the hyphen "—" and the exclamation marks "!!", thereby resulting in the title "World Cup 1 of 2." In some embodiments, particular characters can be identified for removal, such as exclamation marks.

At 504, in some embodiments, process 500 can convert the characters of the text string metadata into one case. For example, in some embodiments, if a video is associated with text string metadata for a title reading "World Cup 1 of 2," process 500 can convert the upper case characters "W" and the "C" into lower case characters, thereby resulting in the title "world cup 1 of 2."

At 506, in some embodiments, process 500 can remove consecutive whitespaces using any suitable technique or combination of techniques and any suitable information. For example, in some embodiments, the description metadata can include a title with multiple consecutive whitespaces, such as the title "World Cup 1 of 2." In such an example, process 404 can remove the consecutive whitespaces such that only nonconsecutive whitespaces remain, thereby resulting in the title "World Cup 1 of 2."

At 508, in some embodiments, process 406 can convert inconsistent characters to representative characters using any suitable technique or combination of techniques and any suitable information. For example, in some embodiments, the description metadata may include characters from two different alphabets and process 404 can convert the letters from one alphabet into representative letters from the other alphabet. In a more particular example, the description metadata could include a title with letters from both the Greek alphabet and the English alphabet, such as the title "ΔZΠ Party Nov. 2012." In such a more particular example, the mechanisms can convert the Greek letters "Δ" and "Π" into English letters such as "D" and "P" to form the title "DZP Party Nov. 2012."

Referring back to FIG. 4, at 408, process 400 can determine similarity scores between the normalized description metadata for a pair of videos using any suitable technique or combination of techniques and any suitable information. For example, in some embodiments, process 400 can determine a similarity score by utilizing a string similarity determination. As a more particular example, in some embodiments, process 400 can determine a Levenshtein distance, a Damerau-Levenshtein distance, fuzzy string matching, or use any other suitable string similarity algorithm. In a still more particular example, process 400 could determine a similarity score between two video content segments associated with description metadata including titles "world cup 1 of 2" and "world cup 2 of 2," respectively, using a Levenshtein distance approach. In such an example, the Levenshtein distance would equal 1, and the similarity score would equal 1.

In some embodiments, process 400 can calculate similarity scores based on any suitable description metadata. For example, process 400 can calculate similarity scores based on description metadata including a title, a summary, a name of a director of the video, a written description of the video and/or any other suitable description metadata associated with a video content segment.

At 410, process 400 can determine whether to place video content segments into a group based on the similarity scores as determined at 408 using any suitable technique or combination of techniques and any suitable information. For example, in some embodiments, process 400 can organize a group of video content segments, where each video content segment in the group has a similarity score above, below, or equal to a threshold similarity score with at least one of the other video content segments in the series. As another example, in some embodiments, process 400 can organize a group of video content segments, where each video content segment in the group has a similarity score above, below, or equal to a threshold score with all of the other video content segments in the series.

In some embodiments, process 400 can determine whether to place video content segments into a group based on a variable threshold score. For example, in some embodiments, process 400 can vary the threshold score based on user metadata. As a more particular example, process 400 can vary the threshold score based on the upload history associated with a user account. As a still more particular example, process 400 can detect that a user often uploads multiple similar videos to the database over a short period of time (e.g., several minutes) followed by long periods of inactivity (e.g., several weeks) and vary the threshold series time period such that the similar videos uploaded within a short period of time fall below the series time period threshold. As another still more particular example, process 400 can detect that a user often uploads similar videos to the database over a long period of time (e.g., several hours) and vary the threshold series time period such that similar videos uploaded within a long period of time from each other fall below the series time period threshold.

As another example of a variable threshold score, process 400 can determine the threshold score based on the number of characters in the description metadata. In such an example, process 400 can reduce the threshold score if the description metadata includes a small number of characters or increase the threshold score if the description metadata includes a high number of characters.

In some embodiments, process 400 can determine whether to place video content segments into a group at any suitable time. For example, in some embodiments, process 400 can determine whether to place a video content segment into a group in response to a user uploading the video content segment. As another example, process 400 can determine whether to place a video content segment into a group in response to a user viewing the video content segment.

In some embodiments, process 400 can determine whether to place a video content segment or segments into a group by transmitting a query to a user that allows the user to approve of a video content segment or segments being placed into a group or groups.

At 412, process 400 can sort the group of video content segments based on time metadata using any suitable technique or combination of techniques and any suitable information. In some embodiments, for example, process 400 can sort the video content segments according to any type of time data, such as the time at which each video was uploaded, the time at which each video was created, or any other suitable time metadata or combination of time metadata.

Figure 6:
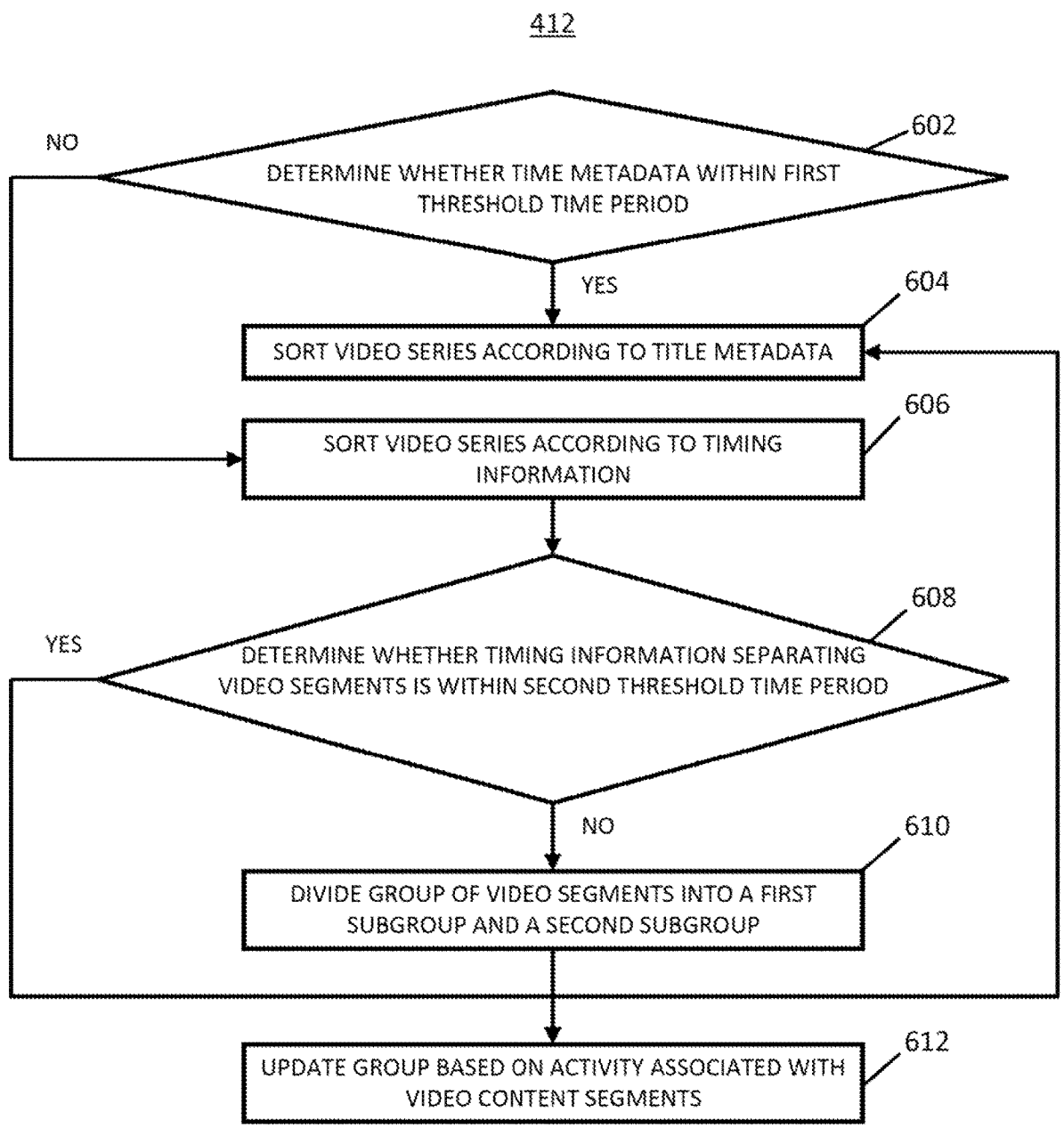
FIG. 6 shows an example of a process for ranking media content segments in a media content group in accordance with some embodiments of the disclosed subject matter.

As another example, referring to FIG. 6, process 600 is an illustrative example of a process for sorting the group of video content segments in accordance with some embodiments of the disclosed subject matter.

At 602, process 600 can determine whether the time metadata falls within a first threshold time period using any suitable technique or combination of techniques and any suitable information. In some embodiments, for example, the time metadata can be any suitable time metadata. As a more particular example, the time metadata can include timing information, where the timing information reflects the times at which the video content segments in the group were uploaded or reflects the times at which the video content segments in the group were recorded.

In some embodiments, process 600 can determine whether the time metadata falls within the first threshold time period using any suitable threshold time period. For example, process 600 can use a predetermined, constant threshold time period. As another example, process 600 can vary the threshold time period based on any suitable information. As a more particular example, process 600 can vary the time period based on activity associated with a user account, the duration of the video content segments, the number of video content segments in the group, and/or any other suitable information.

In some embodiments, process 600 can determine whether the time metadata falls within a first threshold time period using any suitable method. For example, in some embodiments, process 600 can determine whether the time separating the timing information associated with a first video content segment from timing information associated with a second video content segment in the group is within the first threshold time period.

Upon determining that the time metadata is within the first threshold time period at 602, process 600 can sort the video content segments in the group based on title metadata at 604, using any suitable technique or combination of techniques. For example, in some embodiments, process 600 can sort the video content segments in alphabetical order based on the title metadata.

Alternatively, upon determining that the time metadata is not within the first threshold time period at 602, process 600 can sort the video content segments in the group based on timing information at 606 using any suitable technique or combination of techniques and any suitable information. For example, process 600 can sort the video content segments in the group in the chronological order of their timing information.

At 608, process 600 can determine whether the timing information separating two portions of video content segments in the group is within a second threshold time period using any suitable technique or combination of techniques. For example, in some embodiments, the second threshold time period can be any suitable threshold time period. In a more particular example, process 400 can use a predetermined, constant threshold time period. As another more particular example, process 600 can vary the threshold time period based on any suitable information. As a still more particular example, process 400 can vary the threshold time period based on activity associated with a user account, the duration of the video content segments, the number of video content segments in the group, and/or any other suitable information.

In some embodiments, the two portions of video content segments in the group can be any suitable portions of video segments in the group. For example, in some embodiments, a portion of video segments can be any suitable combination of video content segments in the group. As a more particular example, a first portion of video content segments in the group can include the first two consecutive video content segments in the group, as sorted at 604 or 606, and a second portion of video content segments in the group can include any remaining video content segments in the group.

In some embodiments, process 600 can determine whether the timing information separating two portions of video content segments in the group is within a second threshold time period using any suitable method. For example, process 600 can compare the time separating the timing information for the last consecutive video content segment in a first portion of video content segments and the timing information for the first consecutive video content segment in a second portion of video content segments with the second threshold time period.

Upon determining that the timing information separating the two portions of video content segments is not within the second threshold time period at 608, process 600 can divide the group of video content segments at 610 into a first subgroup and a second subgroup. In a more particular example, if a sorted group consisted of four video content segments uploaded to the database on January $1^{st}$, January $2^{nd}$, January $14^{th}$ and January $16^{th}$ of the same year, respectively, and if the second threshold time period was one week, process 400 could divide the sorted group such that the video content segments uploaded on January $1^{st}$ and January $2^{nd}$ would be placed into a first subgroup and the video content segments uploaded on January $14^{th}$ and January $16^{th}$ would be placed into a second subgroup.

At 612, process 600 can update a group of video content segments based on activity associated with the group using any suitable technique or combination of techniques and any suitable information. For example, in some embodiments, process 600 can add a video content segment to the group based on information showing that users frequently view the video content segment along with the video content segments in the group. As another example, process 600 can remove a video content segment from the group based on information showing that users frequently skip the video content segment despite viewing the rest of the video content segments in the group.

In some embodiments, process 600 can update the group of video content segments by reordering the video content segments within the group. For example, process 600 can reorder the video content segments based on information showing that users frequently view one video content segment in the group before another video content segment in the group.

Referring back to FIG. 4, at 414, process 400 can cause a group of video content segments to be presented using any suitable technique or combination of techniques and any suitable information.

In some embodiments, process 400 can cause the group to be presented by playing the video content segments in the group consecutively. For example, turning back to FIG. 1, in some embodiments, if a first video content segment in a group, such as "Graduation May 2013" is played in video window 102, as shown, process 400 can cause a second video content segment in the group, such as video content segment "Graduation May 2013 (2)," as shown at 108, to be in a queue, such that it will be played upon the completion of the first video content segment.

In some embodiments, process 400 can cause the group to be presented by generating a selected list of video content segments from the group to be presented. For example, in response to a user requesting a video content segment from the group, process 400 can generate a list of other video content segments from the group to be presented. In a more particular example, if a user requested the third video content segment in a sorted group consisting of six video content segments, process 400 can generate a list including the fourth, fifth and sixth video content segments from the sorted group to be presented to the user. In such an example, process 400 can present the sorted list by playing each video in consecutive order, by presenting the sorted list as a group of selectable video content segment elements 106, as shown in FIG. 1 at 110, 114 and 116, or by using any other suitable method of presentation.

In some embodiments, process 400 can cause the group to be presented by presenting selectable video content segment elements associated with each video content segment in the group. For example, process 400 can present the selectable video content segment elements associated with each video content segment in response to a user's search for one of the video content segments in the group. As another example, process 400 can present the selectable video content segment elements associated with each video content segment as suggestions for the user to view next. As a more particular example, turning again to FIG. 1, if a video content segment such as "Graduation May 2013" is played in video window 102, as shown, process 400 can present a selectable video content segment element associated with video content segment "Graduation May 2014 (1 of 3)," as shown at 110, together with user interface elements 114 and 116 that are associated with the other video content segments grouped with "Graduation May 2014 (1 of 3)" as suggestions for video content segments for the user to view next.

In some embodiments, process 400 can cause the group of video content to be presented by presenting the user with a query such that the user can decide to watch any of the video content segments in the group by clicking a button, an icon, a hyperlink, or any other suitable selectable element.

Figure 5:
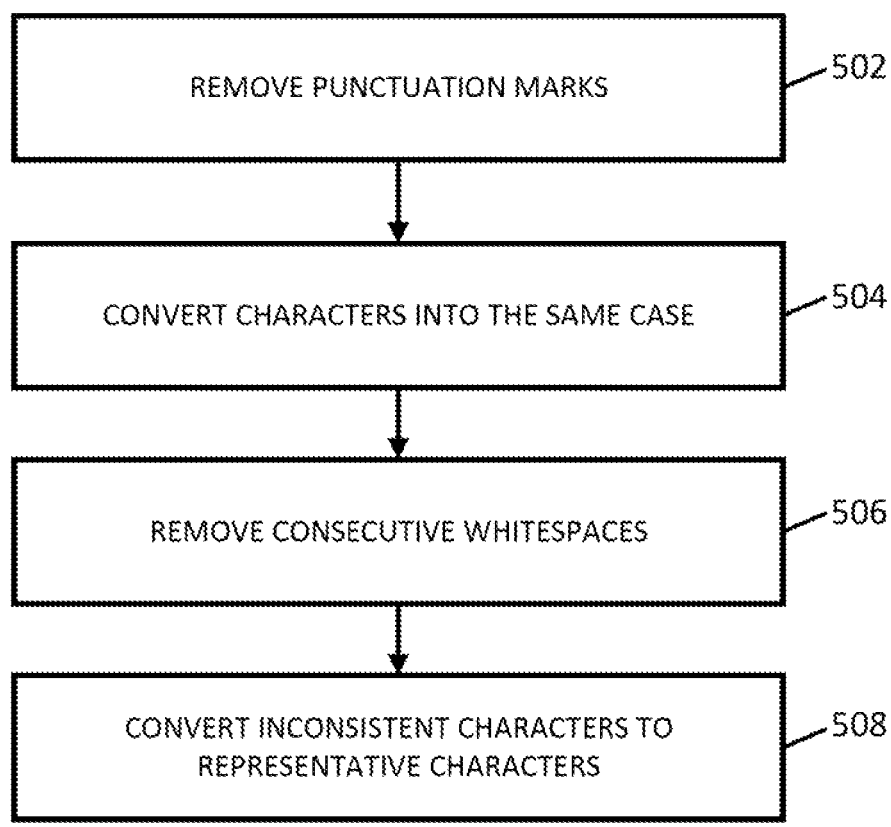
FIG. 5 shows an example of a process for normalizing title information associated with media content items in accordance with some embodiments of the disclosed subject matter.

In some embodiments, at least some of the above described blocks of the processes of FIGS. 4, 5, and 6 can be executed or performed in any order or sequence not limited to the order and sequence shown in and described in connection with the figures. Also, some of the above blocks of FIGS. 4, 5, and 6 can be executed or performed substantially simultaneously where appropriate or in parallel to reduce latency and processing times. Additionally or alternatively, some of the above described blocks of the processes of FIGS. 4, 5, and 6 can be omitted.

Although the embodiments disclosed herein have concerned the presentation of video content, it should be understood that the mechanisms described herein can be applied to video-only content, audio-only content, content with a combination of video and audio elements, three-dimensional content, and/or any other suitable media content.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for recommending video content to users, the method comprising:
   causing a video content item to be presented on a user device;
   identifying a group of video content items related to the video content item being presented;
   determining, for each video content item in the group of video content items, a similarity score that indicates a similarity of the video content item in the group of video content items to the video content item being presented;
   assigning a first portion of video content items in the group of video content items to a first sub-group of video content items and a remaining portion of video content items in the group of video content items to a second sub-group of video content items, wherein the first portion of video content items are identified based on the similarity scores, and wherein each of the video content items in the first portion of video content items are associated with a creator of the video content item being presented; and
   causing a list of recommendations for the video content items in the group of video content items to be presented while concurrently presenting the video content item by causing recommendations for the video content items in the first sub-group of video content items are presented in a higher position within the list of recommendations than recommendations for the video content items in the second sub-group of video content items.

2. The method of claim 1, wherein each of the recommendations for video content items is presented as a selectable element.

3. The method of claim 1, wherein the video content items in the group of video content items are sorted based on timing information associated with each video content item.

4. The method of claim 1, wherein the first portion of video content items are assigned to the first sub-group of video content items based on timing information associated with the first portion of video content items.

5. The method of claim 4, wherein the first portion of video content items are ordered within the first sub-group of video content items based on the timing information.

6. The method of claim 1, further comprising causing a video content item in a first position in the list of recommendations to be presented without user input in response to determining that presentation of the video content item has completed.

7. A system for recommending video content to users, the system comprising:
   a hardware processor that is configured to:
      cause a video content item to be presented on a user device;
      identify a group of video content items related to the video content item being presented;
      determine, for each video content item in the group of video content items, a similarity score that indicates a similarity of the video content item in the group of video content items to the video content item being presented;
      assign a first portion of video content items in the group of video content items to a first sub-group of video content items and a remaining portion of video content items in the group of video content items to a second sub-group of video content items, wherein the first portion of video content items are identified based on the similarity scores, and wherein each of the video content items in the first portion of video content items are associated with a creator of the video content item being presented; and cause a list of recommendations for the video content items in the group of video content items to be presented while concurrently presenting the video content item by causing recommendations for the video content items in the first sub-group of video content items are presented in a higher position within the list of recommendations than recommendations for the video content items in the second sub-group of video content items.

8. The system of claim 7, wherein each of the recommendations for video content items is presented as a selectable element.

9. The system of claim 7, wherein the video content items in the group of video content items are sorted based on timing information associated with each video content item.

10. The system of claim 7, wherein the first portion of video content items are assigned to the first sub-group of video content items based on timing information associated with the first portion of video content items.

11. The system of claim 10, wherein the first portion of video content items are ordered within the first sub-group of video content items based on the timing information.

12. The system of claim 7, wherein the hardware processor is further configured to cause a video content item in a first position in the list of recommendations to be presented without user input in response to determining that presentation of the video content item has completed.

13. A non-transitory computer-readable medium containing computer executable instructions that, when executed by a processor, cause the processor to perform a method for recommending video content to users, the method comprising:

causing a video content item to be presented on a user device;

identifying a group of video content items related to the video content item being presented;

determining, for each video content item in the group of video content items, a similarity score that indicates a similarity of the video content item in the group of video content items to the video content item being presented;

assigning a first portion of video content items in the group of video content items to a first sub-group of video content items and a remaining portion of video content items in the group of video content items to a second sub-group of video content items, wherein the first portion of video content items are identified based on the similarity scores, and wherein each of the video content items in the first portion of video content items are associated with a creator of the video content item being presented; and causing a list of recommendations for the video content items in the group of video content items to be presented while concurrently presenting the video content item by causing recommendations for the video content items in the first sub-group of video content items are presented in a higher position within the list of recommendations than recommendations for the video content items in the second sub-group of video content items.

14. The non-transitory computer-readable medium of claim 13, wherein each of the recommendations for video content items is presented as a selectable element.

15. The non-transitory computer-readable medium of claim 13, wherein the video content items in the group of video content items are sorted based on timing information associated with each video content item.

16. The non-transitory computer-readable medium of claim 13, wherein the first portion of video content items are assigned to the first sub-group of video content items based on timing information associated with the first portion of video content items.

17. The non-transitory computer-readable medium of claim 16, wherein the first portion of video content items are ordered within the first sub-group of video content items based on the timing information.

18. The non-transitory computer-readable medium of claim 13, wherein the method further comprises causing a video content item in a first position in the list of recommendations to be presented without user input in response to determining that presentation of the video content item has completed.

* * * * *